(12) United States Patent
Harato et al.

(10) Patent No.: US 6,299,846 B1
(45) Date of Patent: Oct. 9, 2001

(54) PROCESS FOR PRODUCING ALUMINUM HYDROXIDE FROM ALUMINA-CONTAINING ORE

(75) Inventors: Takuo Harato, Tokyo; Toru Ogawa; Takahiro Ishida, both of Niihama, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/440,043

(22) Filed: Nov. 15, 1999

(30) Foreign Application Priority Data

Nov. 16, 1998 (JP) .................................................. 10-325072
Oct. 13, 1999 (JP) .................................................. 11-290893

(51) Int. Cl.$^7$ ....................................................... C01F 7/00
(52) U.S. Cl. ............................ 423/119; 423/121; 423/127
(58) Field of Search ................................ 423/119, 120, 423/121, 122, 123, 629, 127

(56) References Cited

U.S. PATENT DOCUMENTS

| | | | |
|---|---|---|---|
| 3,632,310 | * 1/1972 | Johnson | 423/122 |
| 3,997,650 | * 12/1976 | Yamada et al. | 423/121 |
| 4,426,363 | * 1/1984 | Yamada et al. | 423/119 |
| 4,614,641 | * 9/1986 | Grubbs | 423/121 |
| 4,650,653 | * 3/1987 | Lepetit et al. | 423/121 |
| 4,661,328 | * 4/1987 | Grubbs | 423/121 |
| 5,118,484 | * 6/1992 | The et al. | 423/121 |
| 5,415,782 | * 5/1995 | Dimas | 423/121 |
| 5,545,384 | 8/1996 | Harato et al. . | |
| 5,653,947 | * 8/1997 | Lamerant | 423/121 |
| 5,833,865 | 11/1998 | Harato et al. . | |
| 5,869,020 | * 2/1999 | Rijkeboer et al. | 423/121 |

* cited by examiner

Primary Examiner—Steven Bos
(74) Attorney, Agent, or Firm—Birch, Stewart, Kolasch & Birch, LLP (57) ABSTRACT

The present invention provides a process for producing aluminum hydroxide with little contamination by silica at a high yield, while suppressing losses of consumed alumina and alkaline components. The process comprises the steps of mixing a first alumina-containing slurry with a preheated alkaline aqueous solution, extracting alumina from the mixture, separating a dissolution residue from the mixture to obtain a solution, mixing the solution with a second alumina-containing slurry, extracting alumina from the mixture, and precipitating aluminum hydroxide after a desilication treatment.

16 Claims, 3 Drawing Sheets

PROCESS FOR PRODUCING ALUMINUM HYDROXIDE FROM ALUMINA-CONTAINING ORE

FIELD OF THE INVENTION

The present invention relates to a process for producing aluminum hydroxide from an alumina-containing ore. Specifically, the present invention relates to a process for producing aluminum hydroxide wherein aluminum hydroxide can be obtained economically at a high yield, with little contamination by silica and with a little loss of an alkaline component, in a so-called Bayer Process for producing aluminum hydroxide.

BACKGROUND OF THE INVENTION

The Bayer Process is well-known and commonly employed for producing aluminum hydroxide from alumina-containing ore such as bauxite. This process usually comprises the steps of:

(i) treating bauxite with an alkaline solution such as an aqueous sodium hydroxide solution or an aqueous mixture solution of a sodium hydroxide solution and a sodium carbonate solution to obtain a slurry (bauxite-dissolving step), (ii) extracting alumina contained in bauxite as sodium aluminate (extraction step), (iii) separating insoluble residues (dissolution residue) such as iron oxides, silicates and titanium oxides from the slurry to obtain a sodium aluminate solution (red mud-separation step), (iv) adding seeds of aluminum hydroxide into the sodium aluminate solution so that aluminum hydroxide is precipitated at a temperature from 50° C. to 70° C. and the precipitated aluminum hydroxide is separated from the sodium aluminate solution (precipitation step), and (v) recycling a portion of the separated aluminum hydroxide as seeds in the precipitation step and recovering the rest of the separated aluminum hydroxide as a product, while the sodium aluminate solution remaining after the recovery of the aluminum hydroxide is recycled as it is or after condensation for the use in the bauxite-dissolving step.

Bauxite usually contains an alkali-soluble silica (hereinafter, referred to as a reactive silica), a content thereof being dependent on a place where it is mined. Therefore, in the above extraction step, the reactive silica contained in bauxite is dissolved as well as the alumina component.

When an extract solution (sodium aluminate solution) containing the reactive silica dissolved therein is used for the precipitation step to obtain aluminum hydroxide, the silica in the solution is also decomposed and precipitated together with aluminum hydroxide, which causes deterioration of the quality of aluminum hydroxide obtained. To avoid the deterioration, the reactive silica in the extract solution is allowed, prior to the precipitation step, to react with a portion of the alumina component and a portion of the alkaline component in the extract solution, so as to precipitate as sodalite or zeolite which is alkali-insoluble (desilication step), and be separated and discarded together with the other insoluble substances such as the iron oxides and the titanium oxides in the red mud-separation step.

In this process, the reactive silica is precipitated by consuming a large amount of the alumina component and the alkaline component in the extract solution and, therefore, a large amount of losses of these components can not be avoided and the process is not economical.

For suppressing the losses of alumina and the alkaline components, Japanese Patent Laid-Open Publication No. 5-193931-A (corresponding to U.S. Pat. No. 5,545,384) discloses a process for producing aluminum hydroxide from an alumina-containing ore described wherein:

(i) the alumina-containing ore is mixed with an alkaline solution to obtain an alumina-containing slurry, (ii) the alumina-containing slurry obtained in step (i) is mixed with a preheated alkaline aqueous solution, to obtain an alkaline aqueous mixture, (iii) alumina is extracted as sodium aluminate from the alkaline aqueous mixture obtained in step (ii) at a temperature of 120° C. to 160° C. within 10 minutes, to obtain a mixture of an extract solution of sodium aluminate and a dissolution residue of a reactive silica, (iv) the dissolution residue is separated from the mixture obtained in step (iii), to obtain the extract solution of sodium aluminate, (v) the extract solution of sodium aluminate obtained in step (iv) is desilicated, to obtain a mixture of a desilication product and a desilicated-extract solution, (vi) the desilication product is separated from the mixture obtained in step (v), to obtain the desilicated-extract solution and (vii) seeds of aluminum hydroxide are added to the desilicated-extract solution obtained in step (vi), to precipitate aluminum hydroxide.

With the process in the JP-5-193931-A, the losses of alumina and alkaline components is quite suppressed and aluminum hydroxide is produced from an alumina-containing ore at a high yield and with little contamination by silica. However, the suppression of the losses of alumina and alkaline components is not sufficient, and the yield of aluminum hydroxide is not sufficient, either and, therefore, a more improved process has been desired.

SUMMARY OF THE INVENTION

In view of the above-described situation, the inventors of the present invention have made extensive studies for a process of producing aluminum hydroxide from an alumina-containing ore such as bauxite, wherein losses of alumina and alkaline components can be much suppressed and aluminum hydroxide can be produced with little contamination by silica and at a much higher yield from an alumina-containing ore, and have thereby accomplished the present invention.

Thus, the present invention provides a process for producing aluminum hydroxide, which comprises the steps of:

(a) mixing a first portion of an alumina-containing ore with a first alkaline solution to obtain a first alumina-containing slurry, (b) mixing the first alumina-containing slurry obtained in step (a) with a preheated alkaline aqueous solution, to obtain a first alkaline aqueous mixture, (c) extracting alumina as sodium aluminate from the first alkaline aqueous mixture obtained in step (b), to provide a mixture of an extract solution of sodium aluminate and a dissolution residue of a reactive silica, (d) separating the dissolution residue from the mixture provided in step (c), to obtain the extract solution of sodium aluminate, (e) mixing the extract solution of sodium Li aluminate obtained in step (d) with a second alumina-containing slurry obtained by mixing a second portion of an alumina-containing ore with a second alkaline solution, to obtain a second alkaline aqueous mixture, (f) extracting alumina as sodium aluminate from the second alkaline aqueous mixture obtained in step (e), to obtain a mixture comprising an extract solution of sodium aluminate, (g) desilicating the mixture comprising the extract solution of sodium aluminate obtained in step (f), to provide a mixture containing a desilication product and a desilicated-extract solution, (h) separating the desilication product from the mixture provided in step (g), to obtain the desilicated-extract solution, and (j) adding seeds of aluminum hydroxide to the desilicated-extract solution obtained in step (h), to precipitate aluminum hydroxide.

With the process of the present invention, aluminum hydroxide is produced from an alumina-containing ore at a higher yield, while the alumina component and the alkaline component is consumed in a very small amount and the contamination by silica in aluminum hydroxide obtained is very little.

DETAILED DESCRIPTION OF THE INVENTION

In the present invention, an alumina-containing ore is used as a raw material. Examples of the alumina-containing ore include ores such as bauxite and laterite, which contain a reactive silica and an alumina of which the major crystal form is that of alumina trihydrate. A content of alumina trihydrate in the alumina-containing ore is usually about 50% by weight or more, preferably about 70% by weight or more, based on the total weight of alumina in the ore. A content of the reactive silica is not particularly limited, and is usually from about 0.5% by weight to about 15 % by weight, preferably from about 0.5% by weight to about 10% by weight, based on the weight of the ore. When bauxite having a high content of the reactive silica is employed, the process of the present invention particularly provides economical advantages.

In the present invention, an alumina-containing ore (such as bauxite) is mixed with an alkaline solution in step (a), to obtain an alumina-containing slurry.

In mixing, the alumina-containing ore can be employed as it is or after being roughly grounded. The alumina-containing slurry obtained in step (a) can be charged into a preheating apparatus to be preheated, when desired, as it is or after being wet grounded.

A smaller particle size of the alumina-containing ore is more preferable so as to make a difference in the dissolution rate between alumina and the reactive silica greater. However, since a larger particle size generally allows easier separation in a following separation step of an extract solution from a dissolution residue, a particle size of the alumina-containing ore to be used may be 10 mesh size or smaller, preferably 60 mesh size or smaller, more preferably from 400 mesh size to 60 mesh size.

The amount of an alkaline solution to be mixed in step (a) is not limited as long as the alumina-containing slurry obtained can be easily transferred to the following step, and a suitable amount thereof may vary depending on a sort, a particle size and other factors of the alumina-containing ore. The solid content in the slurry may be adjusted to be about 20% by weight or higher, preferably in a range of about 30% by weight to about 65% by weight, based on the total weight of the slurry.

The alkaline solution to be mixed in step (a) is not limited as long as the solution is an alkaline component-containing solution such as an aqueous sodium hydroxide solution. Alternatively, the remaining sodium aluminate solution obtained after the recovery of the end product, aluminam hydroxide, the concentrated solution thereof (hereinafter, these solutions being referred together to as a "decomposed solution for recycling"), and washing solution(s) for the dissolution residue and/or the precipitated aluminum hydroxide, which are recycled in each step, may be employed as the alkaline solution to be mixed in step (a).

When the alumina-containing slurry obtained in step (a) is preheated, a preferred temperature of the slurry may be varied depending on the sort of utilized alumina-containing ore, the alkaline concentration of the slurry and the type of the apparatus used for preheating the slurry. An upper limit of the temperature may be about 120° C., preferably about 110° C., and more preferably about 100° C. When the preheating temperature is higher than 120° C., the reactive silica in the alumina-containing ore tends to be dissolved into the slurry during the preheating, undesirably.

A period of time for preheating the alumina-containing slurry obtained in step (a) is preferably set as short as possible, since the extraction of the reactive silica into the slurry proceeds even in the course of the preheating of the slurry. For example, when the preheating is carried out at 120° C., the period of time is preferably set within 10 minutes, more preferably within 5 minutes.

The preheating of the alumina-containing slurry obtained in step (a) is not necessarily required. However, in the case of efficient utilization of heat by recovering heat from the slurry after the extraction of alumina, it is preferred to preheat the slurry to a temperature of about 70° C. or higher, and is more preferred to preheat the slurry to about 80° C. or higher.

For preheating the alumina-containing slurry obtained in step (a), an indirect heating-type heat exchanger such as a double-tube-type heat exchanger, a shell-and-tube-type heat exchanger or a spiral-type heat exchanger is preferably used, since it allows little back mixing and preheats the slurry in a short period of time.

In the present invention, the alumina-containing slurry obtained in step (a) is mixed with another alkaline aqueous solution in step (b).

There is no specific limitation on the alkaline aqueous solution to be mixed with the alumina-containing slurry obtained in step (a), as long as the solution is an alkaline component-containing solution such as an aqueous sodium hydroxide solution. Alternatively, the decomposed solution for recycling or washing solution(s) for the dissolution residue and/or the precipitated aluminum hydroxide, which contain an alkaline component, may be employed as the alkaline aqueous solution to be mixed in step (b), as it is or after being concentrated.

The alkaline aqueous solution utilized in step (b) is previously preheated, and then mixed with the alumina-containing slurry obtained in step (a). The preheating may be conducted in a conventional manner, for example, by passing recovered steam or live steam though the alkaline aqueous solution, so that a temperature of the alkaline aqueous mixture obtained after the alkaline aqueous solution is mixed with the slurry obtained in step (a), reaches the desired extraction temperature.

The preheating temperature of the alkaline aqueous solution utilized in step (b) may be in the range of 120° C. to 170° C., preferably in the range of 150° C. to 170° C.

For preheating the alkaline aqueous solution utilized in step (b), an indirect heating-type heat exchanger such as a double-tube-type heat exchanger, a shell-and-tube-type heat exchanger or a spiral-type heat exchanger is preferably used.

The alumina-containing slurry obtained in step (a) and the preheated alkaline aqueous solution are charged into an extraction apparatus independently or after being mixed together.

A ratio of the alumina-containing slurry to the preheated alkaline aqueous solution is determined depending on factors such as the sort of alumina-containing ore, the solid content of the alumina-containing slurry and the composition of the preheated alkaline aqueous solution, and may be determined so that a molar ratio of Na to Al in terms of $Na_2O/Al_2O_3$ in the mixture obtained therefrom falls within 1.30 to 1.60, preferably 1.35 to 1.50 at an exit of the extraction apparatus, when a Na alkaline component is utilized in the preheated alkaline aqueous solution.

By mixing the alumina-containing slurry and the preheated alkaline aqueous solution together in step (b), the resulting alkaline aqueous mixture may reach at a temperature of about 120° C. to about 140° C. at an entrance of the extraction apparatus, and an extraction of alumina as sodium aluminate is carried out from the alkaline aqueous mixture in step (c).

When the extraction is carried out at the high temperature of about 130° C. to about 140° C., live steam can be directly injected into the preheated alkaline aqueous solution just before being charged to the extraction apparatus, or into the alkaline aqueous mixture obtained in step (b) just before being charged to the extraction apparatus.

It is well-known that there is a difference between extraction rates of alumina and the reactive silica from alumina-containing ore into an aqueous alkaline solution, as disclosed Japanese Patent Publication No. 37-8257-B and Japanese Patent Laid-Open Publication No. 62-230613-A.

When an alkaline content is held constant, the extraction of the alumina contained in an alumina-containing ore can be sufficient and that of the reactive silica contained in the ore can be suppressed as the extraction temperature is high. Therefore, it is preferred that the alumina-containing slurry obtained in step (a) and/or the alkaline aqueous solution to be mixed with the slurry in step (b) are/is previously preheated before mixing with each other so as to raise the temperature of the resulting mixture instantly, as mixing is conducted, to the temperature required for the extraction of alumina, rather than a conventionally practiced process in which the heating is conducted to the alumina-extraction temperature after mixing the alumina-containing slurry obtained in step (a) with the alkaline aqueous solution.

Examples of the preferred method for the extraction of alumina include a so-called binary-fluid-mode extraction comprising the steps of independently preheating the alumina-containing slurry obtained in step (a) and the alkaline aqueous solution to be mixed with the slurry in step (b), mixing with each other to obtain an alkaline aqueous mixture and then charging the mixture into the extraction apparatus. In the case of the binary-fluid-mode extraction, it is preferred that the preheating of the alumina-containing slurry obtained in step (a) is controlled at such a low temperature as to suppress the extraction of the reactive silica, but at such a high temperature as to allow for partial recovery of the applied heat, while the alkaline aqueous solution to be mixed with the slurry is preheated enough to a high temperature, so as to allow the mixture obtained therefrom with the alumina-containing slurry obtained in step (a) to immediately reach the alumina-extraction temperature of about 120° C. to about 140° C. When the temperature of the alkaline aqueous solution to be mixed with the slurry obtained in step (a) is sufficiently high, there in no need to preheat the slurry obtained in step (a).

An apparatus for extraction of alumina is not limited as long as it allows the alumina-containing slurry obtained in step (a) and the preheated alkaline aqueous solution to be sufficiently mixed together and alumina is extracted from the alumina-containing ore in the resulting mixture. A tube reactor with little back mixing may be adiabetically used as the apparatus for extraction of alumina. Alternatively, a conduit for transferring the mixture to the following steps may be employed as the extraction apparatus as long as the conduit is thermally insulated.

The extraction apparatus is not required to have a heating function from its exterior, and it is recommended that a temperature of the alkaline aqueous mixture comprising the alumina-containing slurry obtained in step (a) and the preheated alkaline aqueous solution, is sufficiently high at the entrance of the apparatus so as to allow the extraction of alumina to proceed without supplying additional heat to the apparatus, but with the subjecting of thermal insulation, namely in a so-called adiabatic manner.

This manner is conducted by advantageously utilizing the difference in the dissolution rates between alumina and silica in an alkaline solution. When the same quantity of heat is supplied during the same period of extraction time, it is more advantageous to proceed with the extraction of the alumina while suppressing the extraction of silica, to have a temperature of the alkaline aqueous mixture containing alumina and silica components high at the entrance of the extraction apparatus and to allow the temperature to decrease from the entrance to the exit of the apparatus, rather than to keep the temperature of the mixture constant by using a heating means.

In addition, an extraction apparatus having no heating means may provide another advantage such that the apparatus suppresses a reduction of the heat transfer rate due to scaling which induces many problems with a tube extraction apparatus.

A temperature and a period of time required for the extraction of alumina differ depending on factors such as the sort of the alumina-containing ore, the particle size of the ore, the alkaline concentration in the preheated alkaline aqueous solution utilized for the extraction, the alumina concentration in the resulting mixture, and the ratio of the alumina-containing ore to alkaline components in the preheated alkaline aqueous solution. The most economical conditions may be selected on the basis of unit costs of the raw materials such as the alumina-containing ore and alkaline components, costs of apparatuses, and performances of an apparatuses for the following separation steps.

The alkaline concentration in the mixture for extraction in step (c) may be set at about 100 g/l to about 180 g/l in terms of $Na_2O$, when Na alkaline components are used. The extraction temperature (which is a temperature at the entrance of the extraction apparatus) may fall within a range of about 120° C. to about 140° C., preferably about 125° C. to about 140° C., more preferably about 125° C. to about 135° C. The extraction time may be set within about 10 minutes, preferably within about 5 minutes, more preferably within about 3 minutes. When the extraction temperature is higher than about 140° C. or the extraction time is longer than about 10 minutes, it tends to be difficult to increase the extraction of alumina from the ore while suppressing the extraction of the reactive silica and to decrease the loss of alkaline components.

It is preferred that the conditions of the extraction step (c) are set so as to make the extraction of alumina from the alumina-containing ore as high as possible while keeping the extraction of the reactive silica as low as possible. An extraction ratio of alumina may be about 70% or higher, preferably about 80% or higher, based on the total amount of alumina in the alumina-containing ore from which alumina is extracted, while the extraction ratio of the reactive silica may be set about 70% or lower, preferably about 50% or lower, based on the total amount of silica in the ore.

By extracting alumina as sodium aluminate in step (c) from the alkaline aqueous mixture obtained in step (b), a mixture of an extract solution of sodium aluminate and a dissolution residue of a reactive silica is obtained.

The mixture is immediately transferred to a solid-liquid separation apparatus so that it is separated into the extract solution (liquid) and the dissolution residue of a reactive silica (solid) in step (d). This solid-liquid separation is preferably carried out at almost the same temperature as the extraction temperature.

Any solid-liquid separation apparatus may be used as the solid-liquid separation apparatus in the present invention, provided that residence time of the dissolution residue in the apparatus is short and a volume of the extract solution accompanied by the residue is small. Examples of the separation apparatus include a high-speed separation-type thickener and a centrifuge (i.e., a decanter).

Before the separation, a known coagulant, for example, a polyacrylic acid-type polymer coagulant may be added to the mixture to be separated, so that the separation is accelerated. An amount of the coagulant added to the mixture may be in the known application range, and may be in the range of about 0.005% by weight to about 0.1% by weight based on the weight of the dissolution residue (on a dry basis thereof).

The longer the time needed for the separation becomes, the higher the extraction of the reactive silica from the dissolution residue tends to be. Therefore, it is preferred to carry out the separation in as short a time as possible, and it may be carried out so that the residence time of the dissolution residue in the separation apparatus falls within about 10 minutes, preferably within about 5 minutes.

After separating the dissolution residue from the mixture obtained in extraction step (c), the extract solution of sodium aluminate is obtained. The extract solution of sodium aluminate is then mixed in step (e), as it is or after heating, with another alumina-containing slurry which may be independently prepared by mixing an alumina-containing ore with an alkaline solution. Prior to the mixing of the extract solution of sodium aluminate with the alumina-containing slurry, the extract solution may be subjected to a desilication treatment, and may be recovered, after the desilication treatment, from the resulting mixture by separation.

The desilication treatment may be carried out by adding a seed mainly containing a solid silicate substance into the extract solution of sodium aluminate obtained in separation step (d), so that the reactive silica in the extract solution reacts with a portion of aluminum components and alkaline components in the extract solution, to precipitate a silicate substance such as a sodalite or zeolite which is alkali-insoluble (hereinafter, referred to as a desilication product.) The desilication treatment is preferably employed since the treatment suppresses a scaling in the following mixing step and/or extraction step.

The obtained desilication product can be utilized as a seed for another desilication treatment.

When the concentration of the reactive silica in the extract solution of sodium aluminate is about 10 g/l or higher, the desilication product is spontaneously precipitated in the solution. Even in the case, it is preferred that a seed mainly containing a solid silicate substance is added into the extract solution for the desilication treatment in order to reduce the time needed for desilication and to improve a solid-liquid separation property of the desilication product precipitated.

There is no specific limitation on a type of the reactor for desilication as long as the reactive silica is precipitated from the extract solution of sodium aluminate to reduce the silica concentration in the solution in the reactor. Examples of the reactor for desilication include a reactor equipped with an agitator and a conduit for transferring the extract solution to the following step (e). A reactor equipped with a multi-stage agitator is preferably used.

When the extract solution of sodium aluminate is subjected to a desilication treatment prior to the mixing of the extract solution with the alumina-containing slurry, the desilication treatment may be carried out at a temperature of about 120° C. to about 160° C., preferably about 125° C. to about 160° C., more preferably about 130° C. to about 160° C. A period of time needed for the desilication treatment may fall within the range of about 15 minutes to about 10 hours, preferably about 15 minutes to about 5 hours, more preferably about 30 minutes to about 3 hours. When the desilication treatment is carried out at lower than about 120° C. or within a period of time of shorter than about 15 minutes, the desilication reaction is not sufficiently conducted in the extract solution. The higher the treating temperature is, the faster the desilication-reaction rate is. However, since the higher-treating temperature requires a higher-pressure apparatus, the temperature of the desilication may be decided from an economical view point.

After the desilication treatment, a separation of a desilication product and a filtrate may be employed. When the separation is carried out, the obtained filtrate is used for the following step (e).

In the step (e), the extract solution of sodium aluminate obtained in step (d), the desilicated solution thereof or the filtrate obtained after the desilication treatment is mixed with an alumina-containing slurry.

The alumina-containing slurry may be independently prepared by mixing an alumina-containing ore with an alkaline solution. Alternatively, the alumina-containing slurry to be used in step (b) and in step (e) may be prepared all at once and then divided to use in each step.

The alumina-containing slurry may be prepared by using the same kind of the alumina-containing ore which is utilized in step (a), with or without grinding the ore. A particle size of the alumina-containing ore to be used may be 10 mesh size or smaller, preferably 60 mesh size or smaller, more preferably from 400 mesh size to 60 mesh size.

The solid content in the slurry may be adjusted to be about 20% by weight or higher, preferably in a range of about 30% to about 65% by weight, based on the total weight of the slurry.

As in step (a), there is no specific limitation on the alkaline aqueous solution in the alumina-containing slurry used in step (e) as long as the solution is an alkaline component-containing solution such as an aqueous sodium hydroxide solution. A decomposed solution for recycling and/or washing solution(s) for the dissolution residue or the precipitated aluminum hydroxide, which are recycled in each step, may also be used as the alkaline solution of the alumina-containing slurry in step (e).

An amount of an alkaline solution to be used for preparing the alumina-containing slurry in step (e) is not particularly limited. A suitable amount thereof may vary depending on factors such as the sort of the alumina-containing ore used, the solid content of the slurry, and the composition of the solution with which the alumina-containing slurry is mixed, such as the extract solution of sodium aluminate obtained in step (d). In step (e), a ratio of the solution, with which the alumina-containing slurry (containing the alkaline solution) is mixed, to the alkaline solution in the slurry may be determined so that a molar ratio of Na to Al in terms of $Na_2O/Al_2O_3$ in the mixture obtained therefrom falls within 1.20 to 1.40, preferably 1.25 to 1.35 at an exit of the extraction apparatus in the following step (f), when a Na alkaline component is utilized in the alkaline solution.

After the mixing in step (e), alumina is extracted in step (f) as sodium aluminate from the alkaline aqueous mixture obtained in step (e), to obtain a mixture comprising an extract solution of sodium aluminate.

The temperature and period of time required for the extraction of alumina differ depending on factors such as the sort of the alumina-containing ore, the particle size of the ore used in step (e), the alkaline concentration in the alumina-containing slurry utilized in step (e), the alumina concentration in the resulting mixture, and the ratio of the alumina-containing ore to alkaline components used in step (e).

The alkaline concentration in the mixture obtained by the extraction in step (f) may be set at about 100 g/l to about 180 g/l in terms of $Na_2O$, when Na alkaline components are used. In step (f), the extraction temperature (which is the temperature at the entrance of the extraction apparatus) may fall within a range of about 140° C. to about 160° C., preferably about 150° C. to about 160° C. The extraction time may be set in the range of about 5 minutes to about 120 minutes. When the extraction temperature does not fall within the above range, the precipitation of aluminum hydroxide tends to occur and, therefore, the yield of aluminum hydroxide tends to decrease.

In order to conduct the extraction at a high temperature in step (f), recovered steam or live steam may be passed through the solution and/or the slurry, which are mixed with each other in step (e), either prior to and/or after the mixing thereof together.

An apparatus for extraction of alumina as sodium aluminate in step (f) is not limited as long as it allows a sufficient extraction therein. Examples of the apparatus for the extraction include a tube reactor and a reactor equipped with a multi-stage agitator. When the extraction in step (f) and the desilication in the following step (g) are carried out at about the same temperature, a reactor equipped with a multi-stage agitator is preferably used as the apparatus for extraction of alumina in step (f) so as to proceed the extraction and the desilication at the same time.

The mixture comprising an extract solution of sodium aluminate obtained in step (f) is then subjected to desilication treatment in step (g), as it is, or after it is indirectly heated, or after it is cooled. In step (f), the desilication treatment may be carried out with or without adding a seed mainly containing a solid silicate substance into the mixture comprising the extract solution of sodium aluminate obtained in extraction step (f), so that the reactive silica in the mixture reacts with a portion of aluminum components and alkaline components in the mixture, to precipitate a desilication product.

The obtained desilication product can be utilized as a seed for another desilication treatment.

There is no specific limitation on the type of the desilication reactor in step (g) provided that it provides a sufficient residence time to precipitate the reactive silica from the mixture as the desilication product. Preferably, a reactor equipped with a multi-stage agitator is employed.

A heat-recovery from the mixture may be employed before or after the desilication treatment of step (g), and therefore, a suitable temperature and time needed for the desilication treatment may vary depending on the time when the heat-recovery is conducted. The desilication treatment maybe carried out at a temperature of about 80° C. to about 160° C., preferably about 115° C. to about 160° C., more preferably about 150° C. to about 160° C. A period of time needed for the desilication treatment may fall within the range of about 15 minutes to about 10 hours, preferably about 15 minutes to about 5 hours, more preferably about 30 minutes to about 3 hours.

After the desilication treatment, the desilication product and a dissolution residue which is from the alumina-containing ore used, are separated in step (h) from the resulting mixture obtained in step (g), after the mixture is cooled if desired, to obtain a desilicated-extract solution.

When the mixture is cooled prior to the separation, the cooling may be carried out by using a flash evaporator or an indirect heat exchanger. When the flash evaporator is used, generated steam is recovered to use for preheating the alumina-containing slurry to be used in step (b) or in step (e), or for preheating the decomposed solution for recycling. When the indirect heat exchanger is used, the alumina-containing slurry to be used in step (b) or in step (e), or the decomposed solution for recycling is preheated at the same time when the mixture obtained in step (g) is cooled by exchanging heat with the indirect heat exchanger.

The separation in step (h) may be carried out by using a thickener, a centrifuge or a filter alone or optionally in combination thereof. When a portion of the separated desilication product is reused as the seeds in the desilication treatment, it is preferred to reactivate the desilication product by a processing such as grinding, sieving and/or washing before recycling to the desilication treatment.

In the present invention, it is preferred that the desilication products and the dissolution residues separated in steps (d) and (h), are washed after being cooled if desired, in order to reduce the loss of volume of the extract solution accompanied by the recovery of the desilication products and the dissolution residues. When the desilication products and the dissolution residues are cooled prior to the washing, the cooling may be carried out by using a flash evaporator or an indirect heat exchanger. When the flash evaporator is used, generated steam is recovered to use for preheating the alumina-containing slurry to be used in step (b) or in step (e), or for preheating the decomposed solution for recycling. When the indirect heat exchanger is used, the alumina-containing slurry to be used in step (b) or in step (e), or the decomposed solution for recycling is preheated at the same time when the desilication products and the dissolution residues are cooled by exchanging heat with the indirect heat exchanger.

There is no particular limitation on the type of the apparatus to be used for washing and draining the desilication products and the dissolution residues as long as only a small amount of the silica compounds is extracted from the desilication products during the washing and draining. Examples of the apparatus for the washing and draining include a high-speed thickener, a centrifuge and a filter. These apparatus for the washing and draining may be used alone or optionally in a combination thereof.

Into the desilicated-extract solution obtained in the separation step (h), seeds of aluminum hydroxide are added in step (j), to precipitate aluminum hydroxide. After adding the seeds, the desilicated-extract solution may be maintained at a temperature of about 50° C. to about 70° C. in a period of about 20 hours to 150 hours. Examples of the seeds of aluminum hydroxide to be added in step (j) include crystalline aluminum hydroxides such as Gibbsite, Boehmite and Bayerite, alumina gel, and alumina obtained by calcining the crystalline aluminum hydroxides or the alumina gel. An amount of the seeds to be added may fall within the range of about 0.1 to about 50 parts by weight, preferably about 3 to about 15 parts by weight, based on 100 parts by weight of aluminum hydroxide to be precipitated.

After precipitating aluminum hydroxide in step (j), the aluminum hydroxide is then separated and recovered from the remaining sodium aluminate solution containing alkaline components. The obtained aluminum hydroxide may be washed and dried, while the remaining sodium aluminate solution may be optionally concentrated by an evaporator or the like, and utilized as a decomposed solution for recycling.

In accordance with the present invention, aluminum hydroxide with little contamination by silica is produced from an alumina-containing ore at a high yield, while suppressing losses of alumina and alkaline components consumed, even if the ore in which the reactive silica content is quite high is used as a raw material thereof.

The present invention is described in more detail by reference to the following embodiments using Figures, which should not be construed as a limitation upon the scope of the present invention.

Figure 1:
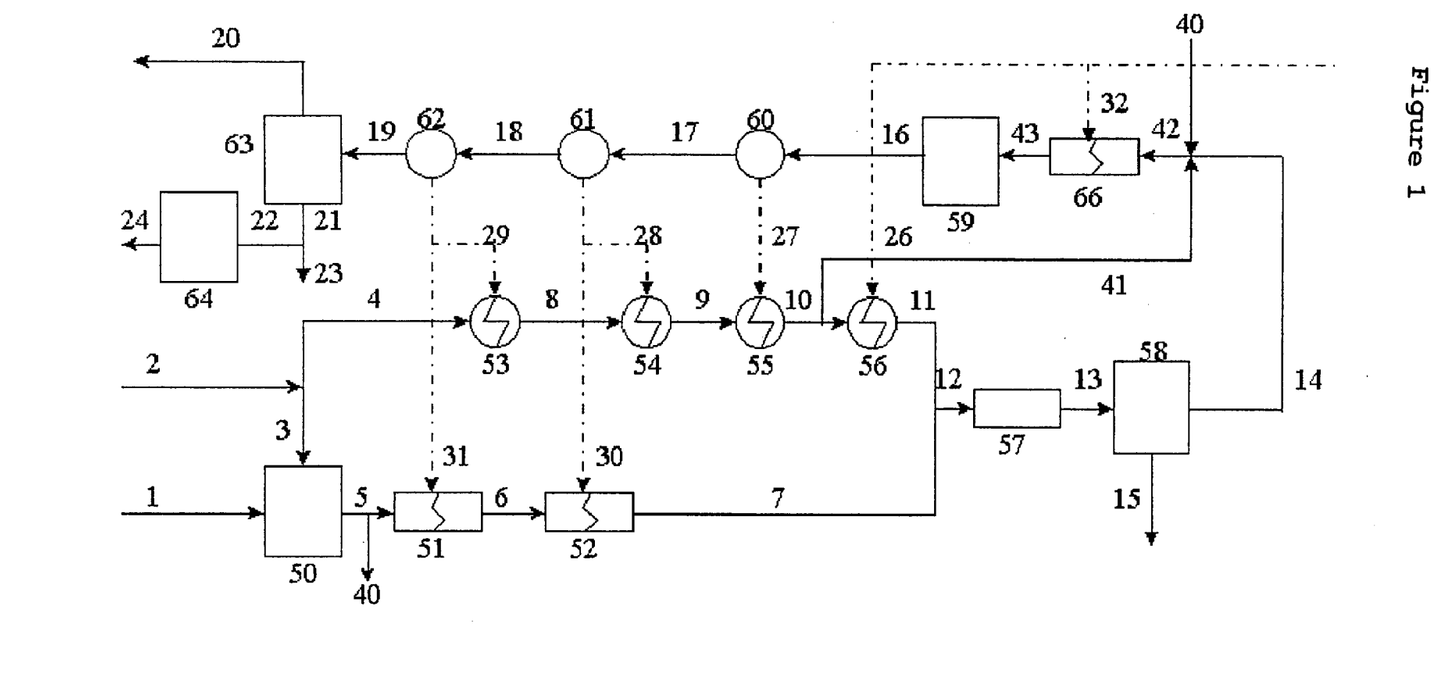
FIG. 1 shows a flow chart of an embodiment of the process of the present invention.
Figure 2:
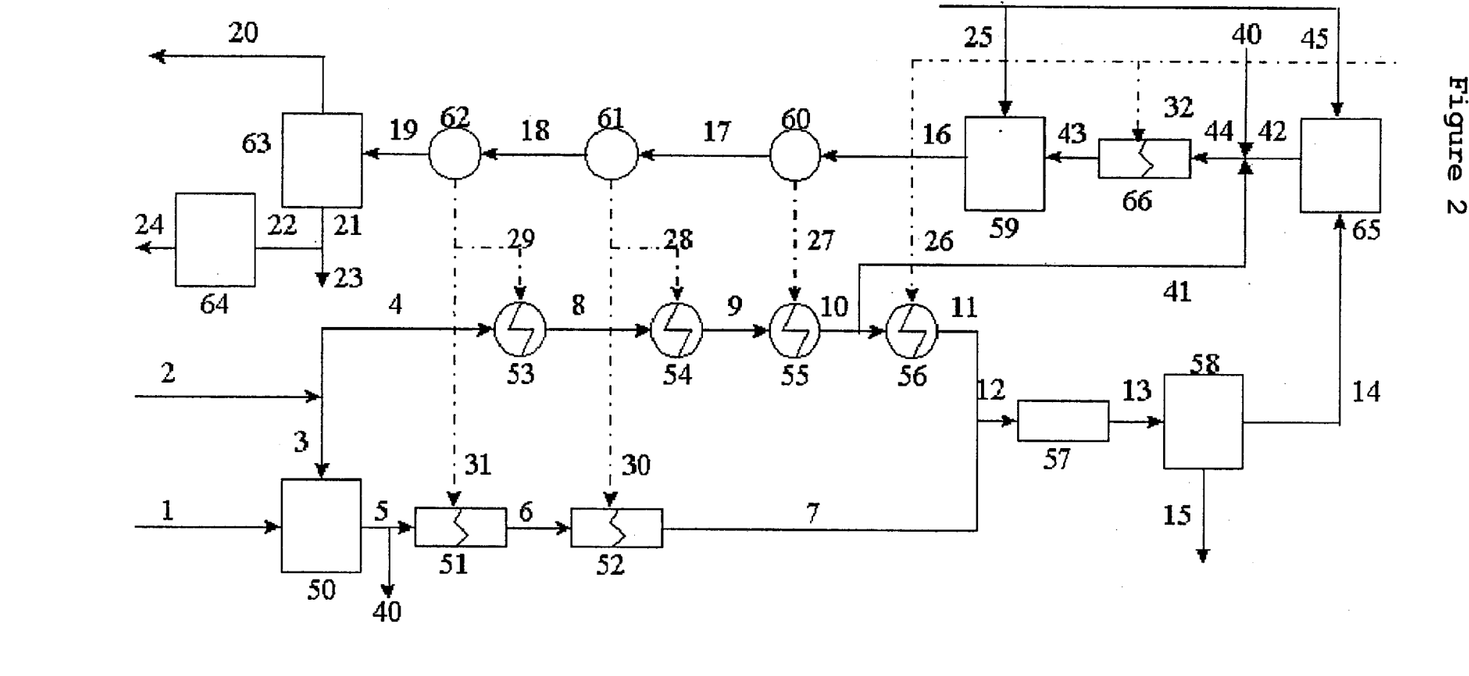
FIG. 2 shows a flow chart of an embodiment of the process of the present invention.
Figure 3:
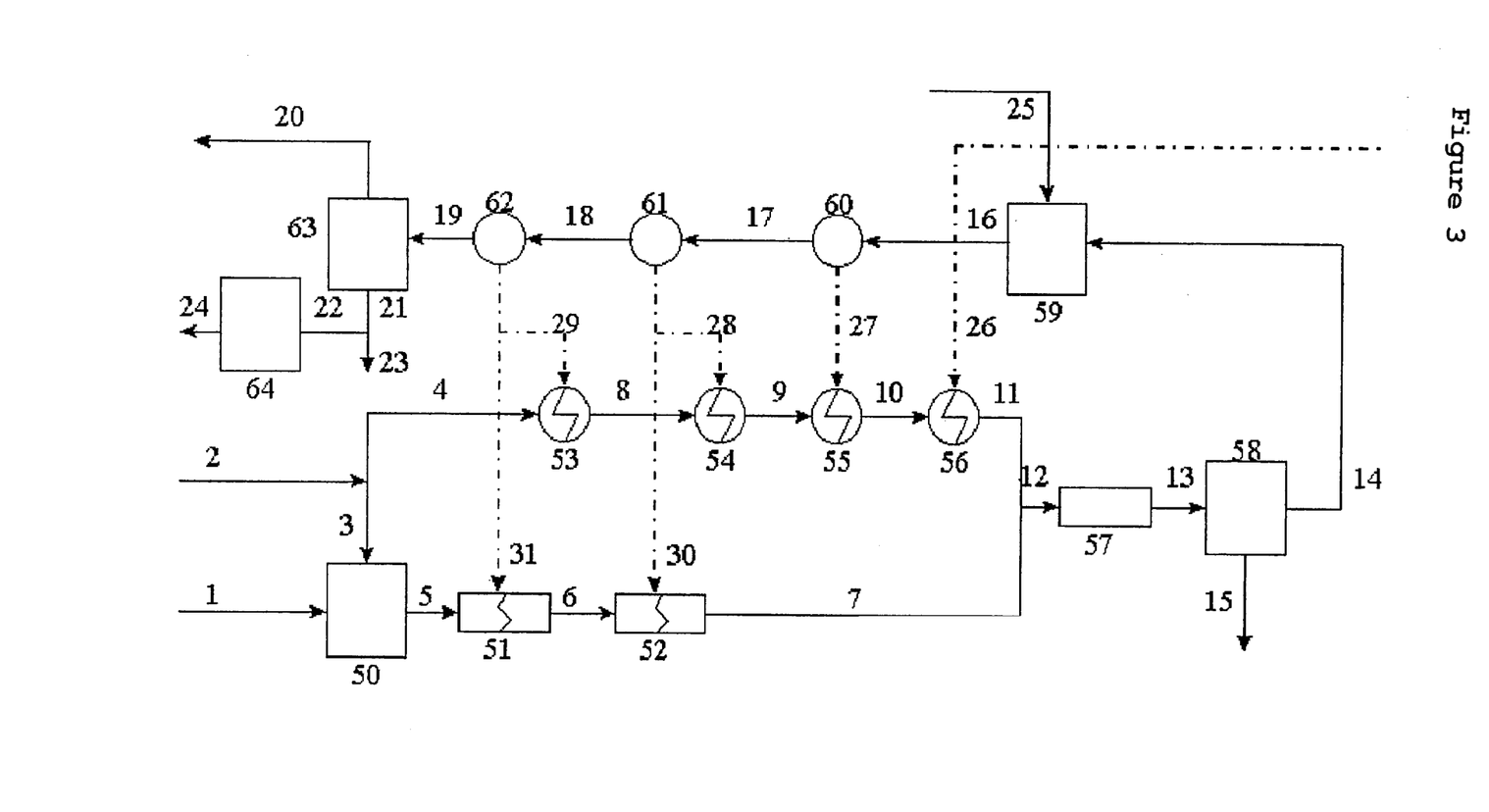
FIG. 3 shows a flow chart of an embodiment of the process of the comparative arts.

FIG. 1 shows a flow chart of an embodiment of the process of the present invention. FIG. 2 shows a flow chart of another embodiment of the process of the present invention. FIG. 3 shows a flow chart of an embodiment of the process of the comparative arts. In the Figures, the numeral 50 stands or a ball mill (a vessel for preparing alumina-containing ore slurry), 51–56 for preheaters, 57 for an extraction apparatus, 58 for a solid-liquid separation apparatus, 59 for a desilication reaction vessel (in which extraction may also be conducted), 60–62 for flash evaporators for cooling, 63 for a solid-liquid separation apparatus, 64 for a grinder, 65 for a desilication reaction vessel, 66 for a double-tube-type heat exchanger, 1 for a line for supplying bauxite, 2 for a line for supplying decomposed solution for recycling and the numbers ranging from 3 to 47 standing for lines (i.e., conduits).

Using a flow chart of FIG. 1, one embodiment of the process of the present invention is described as follows. In FIG. 1, the decomposed solution for recycling is supplied through the tube 2 with dividing into the lines 3 and 4. Bauxite is supplied through the line 1 to the ball mill 50 and is ground and mixed together with the decomposed solution for recycling supplied through the line 3 so that a transferrable slurry is prepared therefrom. Then, the slurry is transferred through the lines 5–6 into preheaters 51 and 52, respectively, each of which comprises a double-tube-type heat exchanger and each of which is so constructed that heat is supplied from the flash evaporator for cooling 62 or 61 through the line 31 or 30, whereby the slurry is preheated to a desired temperature.

The main stream of the decomposed solution for recycling passing through the line 4 is transferred through the lines 8, 9 and 10 into the preheaters 53, 54 and 55 each of which comprises a double-tube-type heat exchanger and each of which is constructed, such that heat is supplied from the flash evaporator for cooling 62, 61 or 60 through the line 29, 28 or 27, whereby the stream is preheated. Then, the stream is transferred through the line 10 into the preheater 56 which comprises a double-tube-type heat exchanger and which is so constructed that heat is supplied by live steam through the line 26, whereby the stream is further preheated. A portion of live steam through the line 26 may be fed directly into the decomposed solution, but it is preferred to use it in an indirect heating manner in the preheater 56 since water balance in the system is maintained, the amount of steam consumed is decreased and the size of the evaporator can be small. The preheating temperature of the decomposed solution for recycling in the preheater 56 is set so as to reach the desired extracting temperature of alumina when the decomposed solution is mixed with the bauxite-containing slurry through the line 7 on the supply into the extraction apparatus 57.

The preheated bauxite slurry and the preheated decomposed solution are transferred through the lines 7 and 11, respectively, mixed together and supplied through the line 12 to the extraction apparatus 57, that is a tube reactor with little back mixing. The extraction temperature at the entrance of the apparatus is in a range of about 120° C. to about 140° C.

The mixture in which the alumina component is extracted in the extraction apparatus 57 from the bauxite as sodium aluminate is then withdrawn immediately through the line 13 and fed into the solid-liquid separation apparatus 58. The mixture contains an extraction solution of sodium aluminate and a dissolution residue of a reactive silica. In the solid-liquid separation apparatus 58, the separation of the dissolution residue from the extract solution is conducted so as to prevent the reactive silica in the dissolution residue from dissolving into the extract solution. Any known polymer coagulant may be added to the mixture that is fed into the solid-liquid separation apparatus 58 at a point of the line 13 for the purpose of the improvement of the separation efficiency. The type of the solid-liquid separation apparatus 58 is not specifically limited provided that the solid-liquid separation is carried out in as short a time as possible, and the residence time of the dissolution residue in the apparatus is usually within about 10 minutes. As such a solid-liquid separation apparatus, a high speed separation-type thickener or a centrifuge is employed.

The mixture fed into the solid-liquid separation apparatus 58 is divided into the dissolution residue (red mud) and the extract solution. The residue (red mud) is transferred through the line 15 to a treating step (not shown) for the dissolution residue, wherein heat and alkaline components are recovered from the residue, and the resulting residue is discharged thereafter.

On the other hand, the extract solution is transferred through the line 14, mixed with another bauxite slurry through the line 40 and the decomposed solution for recycling through the line 41, introduced through the line 42 into the double-tube-type heat exchanger 66, and then heated.

The mixed extract solution, which is heated in the double-tube-type heat exchanger 66, is introduced through the line 43 into the desilication reaction vessel 59 (which is also used as the extraction apparatus, and in which both extraction and desilication are conducted). The extraction temperature at the entrance of the vessel 59 is in a range of about 140° C. to about 160° C. In the desilication reaction vessel (extraction apparatus) 59, the alumina component is extracted as sodium aluminate from the bauxite in the bauxite slurry, and a reactive silica is precipitated as a desilication product in the resulting extract solution. The extract solution containing the desilication product is withdrawn through the line 16, passed to the flash evaporators for cooling 60, 61 and 62 through the lines 17 and 18, cooled there and then transferred into the solid-liquid separation apparatus 63 through the line 19 for separating the desilication product. The steam recovered in the flash evaporators for cooling 60, 61 and 62 is used for preheating the bauxite-containing slurry and the main stream of the above described decomposed solution for recycling, that is the alkaline aqueous solution.

The extract solution containing the desilication product that is fed through the line 19 into the solid-liquid separation apparatus 63 is divided into (i) the desilication product and the dissolution residue, and (ii) the extract solution (sodium aluminate solution). A portion of the desilication product and the dissolution residue are recovered together from the line 23 through the line 21. The remaining desilication product and the dissolution residue are introduced through the line 22 into the grinder 64 to be ground. The extract solution separated in the solid-liquid separation apparatus 63 is transferred into a precipitation apparatus (not shown) of aluminum hydroxide through the line 20. The seeds of aluminum hydroxide are added to precipitate aluminum hydroxide from the extract solution. The precipitated aluminum hydroxide is separated from the solution, washed and dried, while the decomposed solution remained is condensed by an evaporator and recycled to be use through the line 2.

Second, using a flow chart of FIG. 2, another embodiment of the process of the present invention is described as follows. The flow chart of FIG. 2 contains the desilication reaction vessel 65, and the lines 44 and 45 in addition to the flow chart of FIG. 1.

In the embodiment of the process of FIG. 2, the same process as in the process of FIG. 1 is conducted to obtain the extract solution in the solid-liquid separation apparatus 58. The extract solution is transferred through the line 14 into the desilication reaction vessel 65, which is a reactor equipped with a multi-stage agitator. Seeds mainly containing solid silicate substances are added through the line 45 into the desilication reaction vessel 65 for facilitating the desilication treatment. As the seeds, a solid silicate substance commercially available may be employed by being fed from the outside of the process, but in the present embodiment, the desilication product that is separated in the following step is recycled to be used as it is or after an activating treatment for seeds such as washing and grinding. The desilication treatment temperature in the desilication reactor 65 is in a range of about 120° C. to about 160° C., preferably about 125° C. to about 160° C., more preferably about 150° C. to about 160° C. The desilication treatment time is about 15 minutes to about 10 hours, preferably about 15 minutes to about 5 hours, more preferably about 30 minutes to about 3 hours. An average particle size of the desilication product to be used as the seeds is about 1 $\mu$m to about 30 $\mu$m, and an amount of the desilication product to be added is about 5 g/l to about 150 g/l.

In the desilication reaction vessel 65, a reactive silica in the extract solution is precipitated as the desilication product. The extract solution containing the desilication product is transferred through the line 42, mixed with another bauxite-containing slurry through the line 40 and the decomposed solution for recycling through the line 41, and introduced through the line 44 into the double-tube-type heat exchanger 66, and then heated. After that, by carrying out the same process of precipitation and separation of aluminum hydroxide as in the process of FIG. 1, aluminum hydroxide is obtained.

In both FIGS. 1 and 2, definite numbers of the flash evaporator(s) for cooling, the preheater(s) for the decomposed solution and the preheater(s) for the bauxite-containing slurry are shown, but any desired numbers of these apparatuses may be actually employed.

FIG. 3 shows a flow chart of an embodiment of the process of the comparative arts. Compared with the process of FIG. 1, the process of the FIG. 3 is different in the point that the double-tube-type heat exchanger 66 and the lines 32, 40, 41, 42 and 43 are not utilized.

According to the process of the present invention, the extraction of the reactive silica can be markedly suppressed in comparison with the conventional process without losses of alumina and alkaline components when alumina is extracted from an alumina-containing ore such as bauxite to produce aluminum hydroxide. In addition, aluminum hydroxide can be produced with little contamination by silica and at a much higher yield from an alumina-containing ore, along with suppressing losses of alumina and alkaline components, even when an alumina-containing ore having a large content of a react silica is used.

The method for producing aluminum hydroxide of the present invention is described in Japanese applications nos. 10-325072, filed Nov. 16, 1998, and 11-290893, filed Oct. 13, 1999, the complete disclosures of which are incorporated herein by reference.

Throughout this specification and the claims, unless the context requires otherwise, the word "comprise", and variations such as "comprises" and "comprising", will be understood to imply the inclusion of a stated integer or step or group of integers or steps but not the exclusion of any other integer or step or group of integers or steps.

EXAMPLES

The present invention is described in more detail by following Examples, which should not be construed as a limitation upon the scope of the present invention.

Example 1

In Example 1, aluminum hydroxide was produced by using the process and apparatuses shown in FIG. 1. In Example 1, a bauxite having the following analytical composition was used.

The analytical composition of the bauxite used in Example 1 is:
(i) total amount of silica ($SiO_2$) is 4.6% by weight,
(ii) amount of reactive silica ($SiO_2$) is 3.3% by weight,
(iii) total amount of alumina ($Al_2O_3$) is 50.4% by weight,
(iv) amount of iron oxide ($Fe_2O_3$) is 15.8% by weight, and
(v) amount of titanium oxide ($TiO_2$) is 2.1% by weight,
  based on the solid weight of bauxite Bauxite was fed through the line 1, and the decomposed solution for recycling having an $Na_2O$ concentration of 179 g/l and an $Al_2O_3$ concentration of 97 g/l was fed through the line 3, both into the ball mill (a vessel for preparing bauxite-containing slurry), so as to provide a 1st bauxite-containing slurry having a bauxite concentration of 600 g/l, and the bauxite was ground there. Then, the slurry of the ground bauxite was preheated from 70° C. to 95° C. in the preheaters (double-tube heat exchangers) 51 and 52 at a temperature-increasing rate of 7° C./min, by using the recovered steam supplied through the lines 31 and 30. The preheating time of the slurry was 3.5 minutes.

On the other hand, the decomposed solution for recycling from the line 4 was preheated by using the recovered steam supplied through the lines 29, 28 and 27. Furthermore, the decomposed solution for recycling was indirectly preheated to 160° C. in the preheater (double-tube-type heat exchanger) 56 by injecting live steam from the line 26 to the outer tube of the preheater 56.

The bauxite-containing slurry was introduced to the line 12 from the preheater (double-tube-type heat exchanger) 52 through the line 7, together with the decomposed solution for recycling preheated in the preheater 56 through the line 11. The resulting mixture was fed into the extraction apparatus 57, that was a tube reactor, where alumina was extracted adiabatically (without heating from the outside) as sodium aluminate. The temperature of the mixture at an entrance of the extraction apparatus 57 was about 130° C. The preheating time of the mixture was 0.5 minutes. In the mixture, 50% of reactive silica was extracted based on the reactive silica in the 1st bauxite-containing slurry.

The resulting mixture in the extraction apparatus 57 was withdrawn immediately through the line 13 and fed into the solid-liquid separation apparatus 58, that was a high-speed thickener, while a polymer coagulant was added to the mixture at a point of the line 13 at an amount of 0.04% by weight based on the dissolution residue therein. The mixture fed into the solid-liquid separation apparatus (high-speed thickener) 58 was divided into the dissolution residue and the extract solution. The obtained extract solution had an $Na_2O$ concentration of 165 g/l and an $Al_2O_3$ concentration of 185 g/l.

The extract solution was transferred through the line 14 from the solid-liquid separation apparatus 58, mixed with a 2nd bauxite slurry through the line 40 from the vessel 50 and the decomposed solution for recycling through the line 41, introduced through the line 42 into the double-tube-type heat exchanger 66, and then heated indirectly to 150° C. in the exchanger 66 by injecting live steam from the line 32 to the outer tube of the exchanger 66.

The mixed extract solution, which was heated in the double-tube-type heat exchanger 66, was introduced through the line 43 into the desilication reaction vessel 59 (which was also used as the extraction apparatus) and was maintained for about 60 minutes to conduct both extraction and desilication. In the desilication reaction vessel (extraction apparatus) 59, the alumina component in the bauxite was extracted as sodium aluminate, and a reactive silica is precipitated as a desilication product. In the extract solution containing the desilication product, 100% of reactive silica was extracted based on the reactive silica in the 2nd bauxite-containing slurry, i.e., 68% of reactive silica was extracted based on the total amounts of reactive silica in the 1st and 2nd bauxite-containing slurry. The extract solution containing the desilication product was withdrawn through the line 16, passed to the flash evaporators for cooling 60, 61 and 62, cooled there to 100° C. and then transferred into the gravitation-type solid-liquid separation apparatus 63 through the line 19 for separating the desilication product. With the solid-liquid separation apparatus 63, the extract solution containing the desilication product is divided into the desilication product and the dissolution residue, and the extract solution (sodium aluminate solution). The obtained extract solution had an $Na_2O$ concentration of 165 g/l and an $Al_2O_3$ concentration of 218 g/l. The extract solution is transferred into a precipitation apparatus for aluminum hydroxide (not shown) after conducting precision-filtration with filtration equipment for clarifying (not shown). In the precipitation apparatus, aluminum hydroxide was precipitated and recovered. The remaining solution obtained after recovering aluminum hydroxide was analyzed. As a result, it was found that 129 kg of aluminum hydroxide was obtained in terms of $Al_2O_3$, from one(1) m³ of the extraction solution after feeding the 2nd bauxite-containing slurry.

The conditions of Example 1 and the analytical data resulting therefrom are summarized in Table 1.

Comparative Example 1

In Comparative Example 1, aluminum hydroxide was produced by using the process and apparatuses shown in FIG. 3. In Comparative Example 1, bauxite having the same analytical composition as of the bauxite used in Example 1 was utilized.

Bauxite was fed through the line 1, and the decomposed solution for recycling having an $Na_2O$ concentration of 179 g/l and an $Al_2O_3$ concentration of 97 g/l was fed through the line 3, both into the ball mill (a vessel for preparing bauxite-containing slurry) 50, so as to provide a bauxite-containing slurry having a bauxite concentration of 600 g/l, and the bauxite was ground there. Then, the slurry of the ground bauxite was preheated from 70° C. to 110° C. in the preheaters (double-tube heat exchangers) 51 and 52 at a temperature-increasing rate of 7° C./min, by using the recovered steam supplied through the lines 31 and 30. The preheating time of the slurry was 5.7 minutes.

On the other hand, the decomposed solution for recycling from the line 4 was preheated by using the recovered steam supplied through the lines 29, 28 and 27. Furthermore, the decomposed solution for recycling was indirectly preheated to 169° C. in the preheater (double-type heat exchanger) 56 by injecting live steam to the outer tube of the preheater 56.

The bauxite-containing slurry was introduced to the line 12 from the preheater (double-tube heat exchanger) 52 through the line 7, together with the decomposed solution for recycling preheated in the preheater 56. The resulting mixture was fed into the extraction apparatus 57, that was a tube reactor, where alumina was extracted adiabatically (without heating from the outside) as sodium aluminate. The temperature of the mixture at an entrance of the extraction apparatus was about 142° C. The preheating time of the mixture was 0.5 minutes. In the mixture, 68% of reactive silica was extracted based on the reactive silica in the bauxite-containing slurry utilized.

The resulting mixture in the extraction apparatus 57 was withdrawn immediately through the line 13 and fed into the solid-liquid separation apparatus 58, that was a high-speed thickener, while a polymer coagulant was added to the mixture at a point of the line 13 at an amount of 0.04% by weight based on the dissolution residue therein. The mixture fed into the solid-liquid separation apparatus 58 was divided into a dissolution residue and an extract solution.

The extract solution was transferred into the desilication reaction vessel 59, and 50 g of a desilication product as seeds were added thereto per one (1) L of the solution to conduct desilication treatment for about 60 minutes. The extract solution containing the desilication product was withdrawn through the line 16, passed to the flash evaporators for cooling 60, 61 and 62, cooled there to 100° C. and then transferred into the gravitation-type solid-liquid separation apparatus 63 for separating the desilication product. With the solid-liquid separation apparatus, the extract solution containing the desilication product is divided into the desilication product and the dissolution residue, and the extract solution (sodium aluminate solution). The obtained extract solution had an $Na_2O$ concentration of 165 g/l and an $Al_2O3$ concentration of 205 g/l. The extract solution is transferred into a precipitation apparatus for aluminum hydroxide (not shown) after conducting precision-filtration with a filtration equipment for clarifying (not shown). In the precipitation apparatus, aluminum hydroxide was precipitated and recovered. The remaining solution obtained after recovering aluminum hydroxide was analyzed. As a result, it was found that 116 kg of aluminum hydroxide was obtained in terms of $Al_2O_3$, from one (1) m³ of the extraction solution after feeding the bauxite-containing slurry.

The conditions of Comparative Example 1 and the analytical data resulting therefrom are summarized in Table 1.

TABLE 1

|  | Example 1 | Comparative Example 1 |
|---|---|---|
| Preheating condition of the 1st bauxite-containing slurry | | |
| Preheating temperature (° C.) | 70 → 95 | 70 → 110 |
| Preheating time (minutes) | 3.5 | 5.7 |
| 1st Extraction | | |
| Extraction temperature (° C.) | 130 | 142 |
| Extraction time (minutes) | 0.5 | 0.5 |
| $Na_2O$ concentration*[1] (g/l) | 165 | 165 |
| $Al_2O_3$ concentration*[1] (g/l) | 185 | 205 |
| Extraction rate of reactive silica*[2] (%) | 50 | 68 |
| 2nd Extraction | | |
| Extraction temperature (° C.) | 150 | — |
| Extraction time (minutes) | 60 | — |
| $Na_2O$ concentration*[3] (g/l) | 165 | — |
| $Al_2O_3$ concentration*[3] (g/l) | 218 | — |
| Extraction rate of reactive silica*[4] (%) | 100 | — |
| Productivity $(kg/in^3)$*[5] | 129 | 116 |
| Extraction rate of reactive silica*[6] (%) | 68 | 68 |

*[1]In the 1st extract solution.
*[2]Based on the amount of reactive silica in the 1st bauxite-containing slurry.
*[3]In the 2nd extract solution.
*[4]Based on the amount of reactive silica in the 2nd bauxite-containing slurry.
*[5]The amount of aluminum hydroxide in terms of $Al_2O_3$ obtained from one (1) $m^3$ of the extract solution after feeding all of the bauxite-containing slurry.
*[6]Based on the amount of reactive silica in the 1st and 2nd bauxite-containing slurry.

As shown in Table 1, the process of-the present invention (Example 1) provides aluminum hydroxide at a higher yield than that of the comparative art (Comparative Example 1), even though the extraction rate of reactive silica is suppressed at the same low level as of the comparative art.

What is claimed is:

1. A process for producing aluminum hydroxide, which comprises the steps of:
   (a) mixing a first portion of an alumina-containing ore with a first alkaline solution to obtain a first alumina-containing slurry,
   (b) mixing said first alumina-containing slurry obtained in step (a) with a preheated alkaline aqueous solution, to obtain a first alkaline aqueous mixture,
   (c) extracting alumina as sodium aluminate from said first alkaline aqueous mixture obtained in step (b), to provide a mixture of an extract solution of sodium aluminate and a dissolution residue of a reactive silica,
   (d) separating said dissolution residue from said mixture provided in step (c), to obtain the extract solution of sodium aluminate,
   (e) mixing the extract solution of sodium aluminate obtained in step (d) with a second alumina-containing slurry obtained by mixing a second portion of an alumina-containing ore with a second alkaline solution, and mixing the extract solution with a third alkaline solution to obtain a second alkaline aqueous mixture,
   (f) extracting alumina as sodium aluminate from said second alkaline aqueous mixture obtained in step (e), to obtain a mixture comprising an extract solution of sodium aluminate,
   (g) desilicating said mixture comprising the extract solution of sodium aluminate obtained in step (f), to provide a mixture containing a desilication product and a desilicated-extract solution,
   (h) separating the desilication product from said mixture provided in step (g), to obtain the desilicated-extract solution, and
   (j) adding seeds of aluminum hydroxide to said desilicated-extract solution obtained in step (h), to precipitate aluminum hydroxide.

2. The process according to claim 1, wherein said preheated alkaline aqueous solution in step (b) has a temperature that falls within a range of 120° C. to 170° C.

3. The process according to claim 1, wherein alumina is extracted in step (c) at a temperature of 120° C. to 140° C. within 10 minutes.

4. The process according to any one of claims 1 to 3, wherein alumina is extracted in step (f) from said second alkaline aqueous mixture obtained in step (e), at a temperature of 140° C. to 160° C.

5. The process according to claim 1, further comprising the step of:
   (k) desilicating said extract solution of sodium aluminate obtained in step (d), prior to mixing with said second alumina-containing slurry in step (e).

6. The process according to any one of claims 1 to 3, wherein said first alumina-containing slurry obtained in step (a) is preheated to a temperature of 70° C. to 120° C., prior to mixing with said preheated aqueous alkaline solution in step (b).

7. The process according to any one of claims 1 to 3, wherein 50% by weight or more of the total content of alumina in said alumina-containing ore is alumina trihydrate.

8. The process according to any one of claims 1 to 3 and 5, wherein said desilication product separated in step (h) is recycled and utilized after being ground, to carry out the desilicating of said mixture in step (g) and/or said extract solution in step (k).

9. The process according to any one of claims 1 to 3, wherein both of said first alumina-containing slurry obtained in step (a) and said second alumina-containing slurry in step (e) each individually have a solids content of not less than 20% by weight.

10. The process according to claim 1, wherein in step (d), the extract solution has a temperature with a range of about 120° C. to about 140° C.

11. The process according to claim 1, wherein at least one of the alkaline solutions is a decomposed solution.

12. The process according to claim 1, wherein in the step (b) a ratio of $Na_2O/Al_2O_3$ in the first alkaline aqueous mixture is about 1.30 to about 1.60.

13. The process according to claim 1, wherein in the step (b) the first alkaline aqueous solution has an alkaline concentration of about 100 g/l to about 180 g/l in terms of $Na_2O$.

14. The process according to claim 1, wherein in the step (e) a ratio of $Na_2O/Al_2O_3$ in the second alkaline aqueous mixture is about 1.20 to about 1.40.

15. The process according to claim 1, wherein in the step (f) the mixture comprising an extract solution of sodium aluminate has an alkaline concentration of about 100 g/l to about 180 g/l in terms of $Na_2O$.

16. The process according to claim 1, wherein the seeds are added at about 0.1 to about 50 parts by weight, based upon 100 parts by weight of the aluminum hydroxide to be precipitated.

* * * * *